United States Patent [19]

Young et al.

[11] Patent Number: 4,833,694
[45] Date of Patent: May 23, 1989

[54] SIGNAL RECEIVER

[75] Inventors: Nicholas A. Young, London; Alister G. Burr, York, both of England

[73] Assignee: Thorn Emi plc, London, England

[21] Appl. No.: 94,842

[22] Filed: Sep. 10, 1987

[30] Foreign Application Priority Data

Sep. 11, 1986 [GB] United Kingdom ............... 8621875

[51] Int. Cl.$^4$ .................................... H04B 15/00
[52] U.S. Cl. ............................. 375/58; 375/96; 364/728.03
[58] Field of Search ............. 375/1, 96, 115, 58, 375/116, 76; 370/107; 364/604, 728; 382/42

[56] References Cited

U.S. PATENT DOCUMENTS

| | | | |
|---|---|---|---|
| 3,953,674 | 4/1976 | Fletcher et al. | 375/115 |
| 4,039,749 | 8/1977 | Gordy et al. | 375/115 |
| 4,221,005 | 9/1980 | La Flame | 375/115 |
| 4,435,822 | 3/1984 | Spencer et al. | 375/1 |
| 4,606,039 | 8/1986 | Nicolas et al. | 375/96 |
| 4,638,494 | 1/1987 | Kartchner et al. | 375/115 |

FOREIGN PATENT DOCUMENTS 0088564 9/1983 European Pat. Off. .

Primary Examiner—Robert L. Griffin
Assistant Examiner—Stephen Chin
Attorney, Agent, or Firm—Fleit, Jacobson, Cohn & Price

[57] ABSTRACT

A signal receiver for use in a system for communication and telecontrol over the electricity mains network has a correlation stage in which values of correlation coefficients for a received signal are predicted in a processor taking due account of known distortions of the network. Then these coefficients are multiplied, shifted and averaged with recent results to minimise the effects of noise, the consequent values being multiplied by the actual correlation values of the received signal in the bins for comparison.

5 Claims, 4 Drawing Sheets

SIGNAL RECEIVER

FIELD OF THE INVENTION

The present invention relates to a signal receiver for use in communication over noisy lines and more particularly, but not exclusively, for use in communication and telecontrol over the electricity mains network, and also to a method of processing signals in such a signal receiver.

BACKGROUND OF THE INVENTION

European Patent Specification Publication No. 88564 describes a mains telecontrol system in which each transmitted "1" bit is represented by a first pseudo-random sequence of 1024 bit-elements (referred to as "chips"), and each "0" bit by a second such sequence. In the receiver, each sequence of 1024 chips is correlated with two reference sequences stored in the receiver to determine whether the received sequence represents a "1" or a "0". Since the transmitter and receiver are not synchronised, the correlation must be repeated for each phase; in order to expedite the operation, the correlation is performed for eight different phase locations simultaneously. Once the 1024 bit sequence has been received, the receiver contains 16 correlation values each consisting of a number stored in a "bin". To process the correlation values each of them is squared and then the resultant products in each set are added, the two sums being compared in order to determine whether the received sequence represents a "1" or a "0".

SUMMARY OF THE INVENTION

An object of the present invention is to provide an improved analysis of the correlation results.

The present invention provides a line network communication system including a transmitter means capable of transmitting a series of coded data signals on a baseband carrier signal and receiver means capable of receiving a transmitted signal and recovering therefrom said coded data signals, the receiver means being arranged to operate in a search mode to compare a series of received data signals with a series of coded reference signals at different relative phases until at least one comparison signal generated as a result of said comparisons indicates a degree of correlation exceeding a threshold value, a tracking mode to verify that said degree of correlation exists for a preset time interval and, in dependence on a successful verification in the tracking mode, a locking mode to maintain a selected phase difference between the compared series while said degree of correlation exists permitting recovery of the coded signals, the receiver having means to predict values for stored correlation coefficients for a sequence in a received signal and means to effect an anlysis process in which the actual correlation values stored are multiplied by the corresponding predicted correlation coefficients and the resultant products of each set related to a reference signal are summed, thereafter these two summed values being compared to determine the identity of the sequence.

By this technique of estimating the value of a correlation number and then using it in the processing of the actual correlation number, account can be taken of known distortions in the communication system.

The present invention also provides a receiver for use in a line network communication system including a transmitter means capable of transmitting a series of coded data signals on a baseband carrier signal, characterised in that the receiver comprises means to operate in a search mode to compare a series of received data signals with a series of coded reference signals at different relative phases until at least one comparison signal generated as a result of said comparisons indicates a degree of correlation exceeding a threshold value, means to operate in a tracking mode to verify that said degree of correlation exists for a preset time interval, means to operate, in dependence on a successful vertification in the tracking mode, in a locking mode to maintain a selected phase difference between the compared series while said degree of correlation exists permitting recovery of the coded signals, the receiver having means to predict values for stored correlation coefficients for a sequence in a received signal and means to effect an analysis process in which the actual correlation values stored are multiplied by the corresponding predicted correlation coefficients and the resultant products of each set related to a reference signal are summed, thereafter these two summed values being compared to determine the identity of the sequence.

The present invention also provides a method of processing signals in a receiver for use in a line network communication system including a transmitter means capable of transmitting a series of coded data signals on a baseband carrier signal and receiver means capable of receiving a transmitted signal and recovering therefrom said coded data signals, the method comprising, in a search mode comparing a series of received data signals with a series of coded reference signals at different related phases until at least one comparison signal generated as a result of said comparisons indicates a degree of correlation exceeding a threshold value, in a tracking mode verifying that said degree of correlation exists for a preset time interval, and, in dependence on a successful verification in the tracking mode, in a locking mode to maintain a selected phase difference between the compared series while said degree of correlation exists permitting recoverying of the coded signals, said comparison stage comprising predicting values for stored correlation coefficients and effecting an analysis process comprising multiplying the actual stored correlation values by the corresponding predicted correlation coefficients, summing the resultant products of each set related to a reference signal, and comparing the two sums to determine the identify of the sequence.

The present invention provides a signal receiver having a matched filter for use on the correlation numbers, thereby to take the transmitted signal characteristics into account.

BRIEF DESCRIPTION OF THE DRAWINGS

In order that the invention may more readily be understood, a description is now given, by way of example only, reference being made to the accompanying drawings of which FIGS. 1 to 5 show representations of correlation functions, and FIG. 6 is an appropriate block circuit diagram of equipment embodying the present invention.

FIGS. 1a, 1b and 2 show representation of the correlation process involving sequences of 11 chips length. FIG. 2 shows a complete correlation function, some of the centre portion (indicated as M) forming the matched filter.

Figure 3:
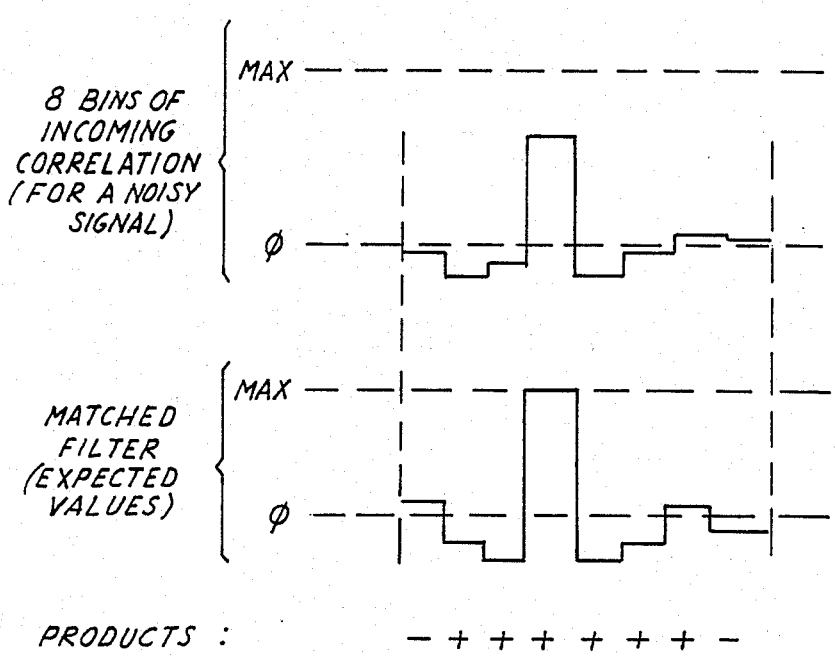
FIG. 3 shows representations of a "matched filter" method.

The present invention embodies a "matched filter" method consisting of multiplying the eight bin values by numbers whose magnitudes are determined by the expected values of the bins (see FIG. 3). The correlation function in the absence of noise can be predicted exactly, though it changes gradually with time. The filter coefficients are determined by the known shape of the correlation function, and also by any known changes introduced by the communication medium, enabling allowance to be made for a distorting system.

Thus, as shown by FIG. 3, the sum of the products is positive and at a maximum for no noise. As noise appears in the correlation function, the sum decreases and tends to an average of zero. The operation is performed on the data 0 and data 1 reference sequences, and the results correspond to determine which data bit has been received.

Figure 4:
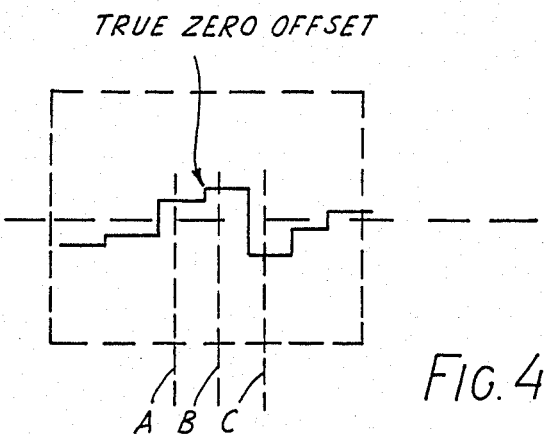
FIG. 4 shows a representation of a zero offset.

Most communication systems have unsynchronised clocks. This means that, even when initial synchronisation of the transmitted and received signals is achieved, advantageously there is provision to monitor the relative drift in the clock frequencies and ensure that the zero offset position of the correlation function is aligned with the centre of the matched filter. The filter itself can be profitably used to do this, as can be seen by FIG. 4, which shows a centroid estimate in a noisy correlation function. The centre position of the material filter in three different places is indicated by A, B, and C of which B gives the maximum value, thereafter A, with C possibly being negative. The multiplication is performed in three or more positions on the correlation function and the greatest result chosen. This is then averaged with an appropriate number of previous results (eight for instance) to reduce the effects of noise on the estimate. Finally the multiplcation is performed at the position represented by this averaged result, and the results is used to determine which data bit is received.

Figure 5:
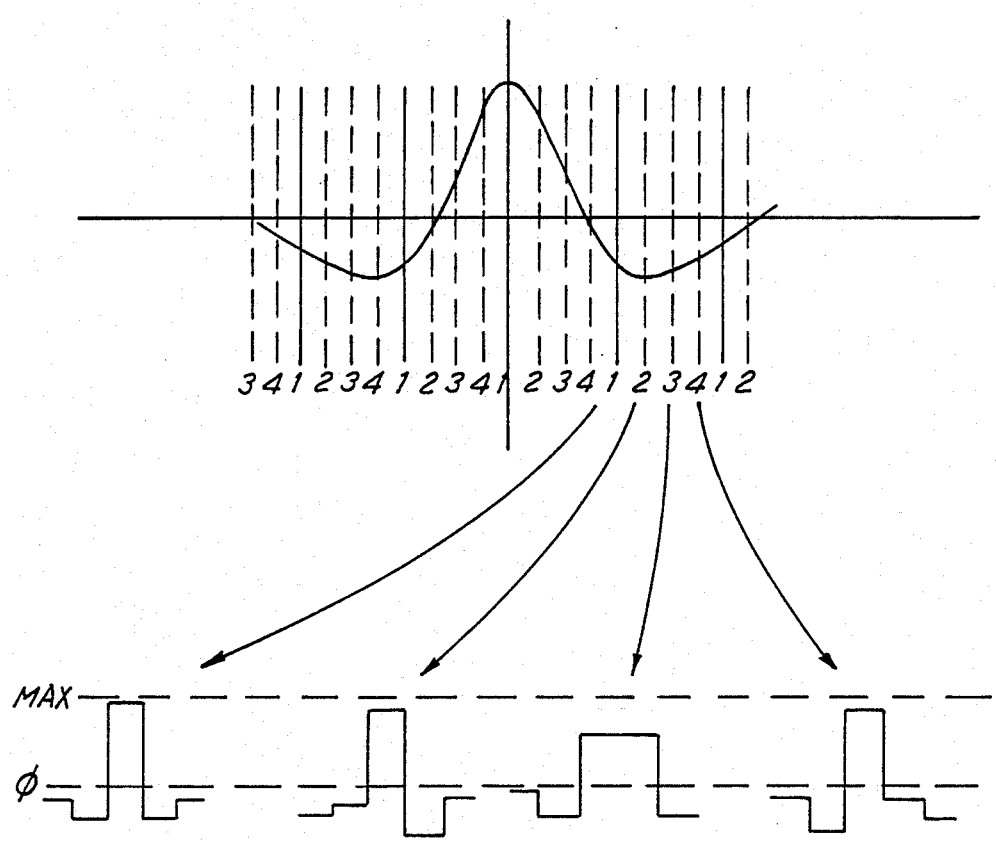
FIG. 5 shows a representation of a change in shape of the filter with clock drift.

The clock drift causes the contents of the bins to change gradually even when there is no noise, and the averaging process yields precision in the zero position estimate of greater than one bin (i.e. one eighth part in this example). For these reaons there need to be more filter coefficients than just one for each bin, and in this case eight per bin are used. Thus when the zero position is estimated as being between two bins the appropriate coefficients can be used, instead of spoiling the result by using an inaccurate matched filter. See FIG. 5 for the change in shape of the filter with clock drift, which occurs because it is a sampled version of a continuous correlation function. This Figure illustrates the continuous function and four samples per chip, giving four different filter shapes, the example having only five bins.

Figure 6:
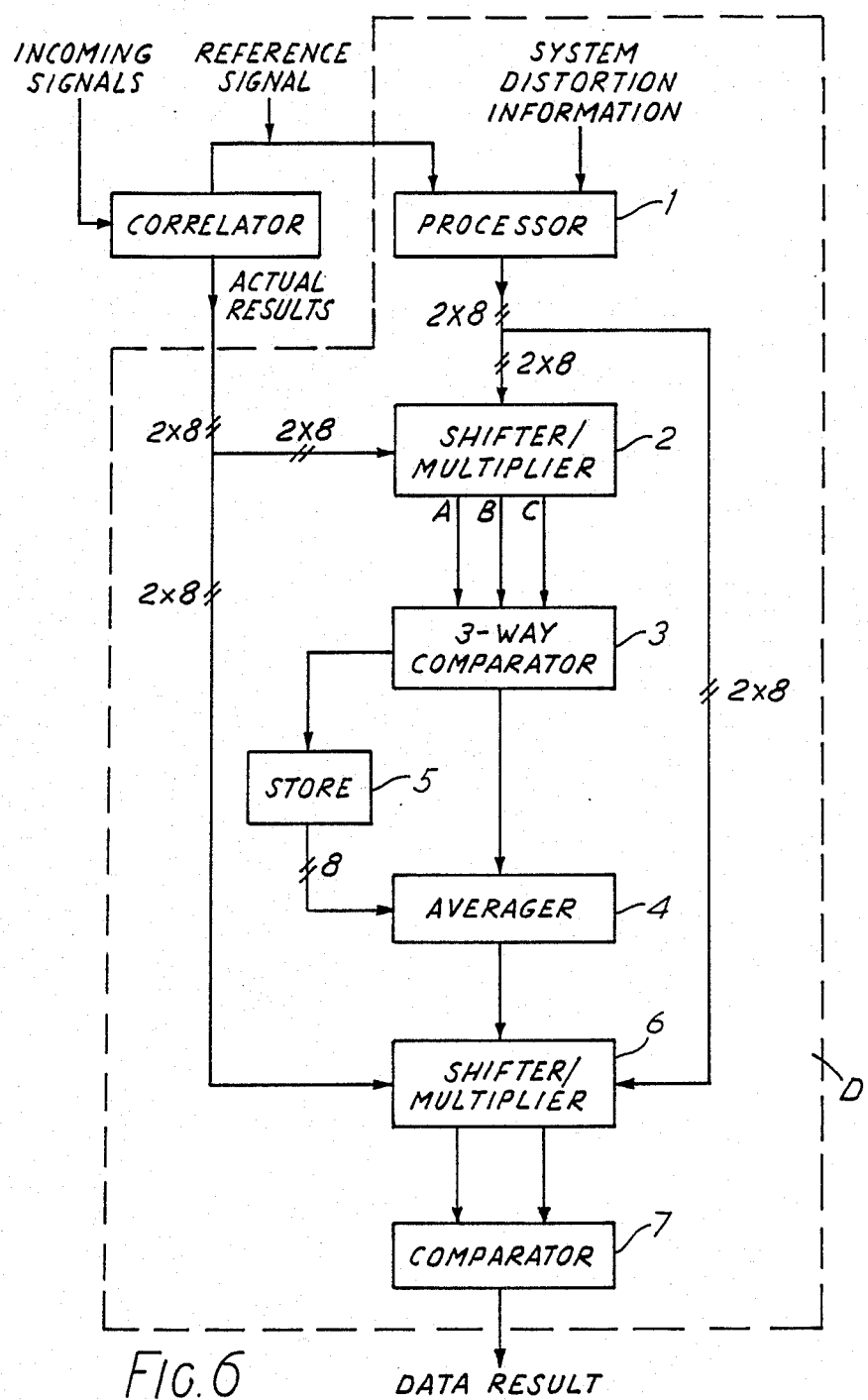
FIG. 6 shows a block diagram of a system which operates in accordance with the present invention.

FIG. 6 shows a block diagram of a system which operates in accordance with the present invention, the elements within box D defined by the broken line constituting the analysis technique.

The incoming signal from the transmission medium (e.g. mains) is correlated with the reference signal. The reference signal for data $\phi$ and data 1 is adjusted in magnitude and phase in processor 1 to take account of any known distortions of the medium, and expected correlation results for both data $\phi$ and data 1 are produced. These expected results are multiplied in shifter/multiplier 2 in the current position and shifted by one chip to left and right of the current position; the results are compared at comparator 3 in magnitude to determine the optimum position. This position is averaged at averager 4 with seven previous positons stored at storage 5 to give a more precise estimate of the correct position and to filter out the effects of noise. The results from processor 1 are then multiplied at shifter/multiplier 6 by the correlation results in this optimum position and the two results for data $\phi$ and data 1 are compared at comparator 7 in magnitude to decide which data bit has been received.

Figure 1A:
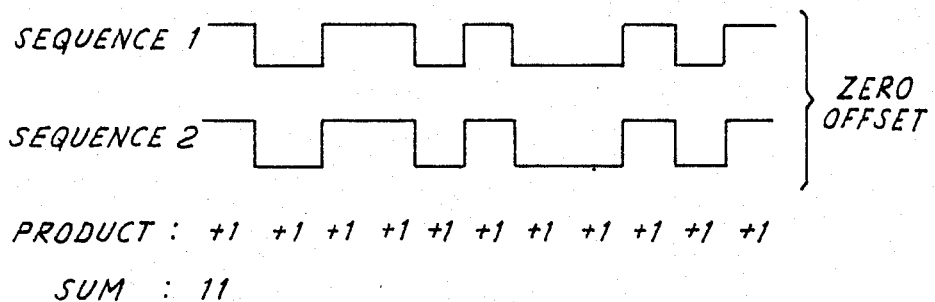
FIGS. 1a, 1b and 2 show representations of the correlation process involving sequences of 11 chips length.
Figure 1B:
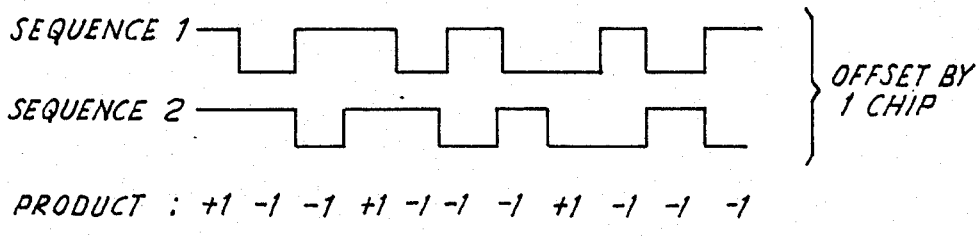
Figure 2:
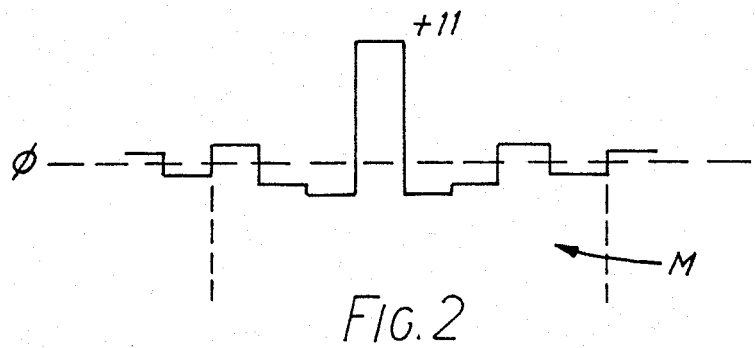

In a modification, the functions of at least one or more of the components illustrated in FIG. 1 can be implemented by computer software.

This system gives an improvement of up to 10 dB signal-to-noise ratio over the conventional system, without taking account of the transmission medium characteristics; further improvement can be obtained by incorporating these characteristics into the filter coefficients.

Other embodiments of the present invention may adopt different numbers of bins and different numbers of previous results in the estimation can be used, depending on the noise level, clock drift rate and also processing power available.

We claim:

1. A line network communications system including a transmitter means capable of transmitting a series of coded data signals on a baseband carrier signal and receiver means capable of receiving a transmitted signal and recovering therefrom said coded data signals, the said receiver means comprising:

electronic searching means including a correlator to compare a series of received data signals with a series of coded reference signals at different relative phases until at least one comparison signal generated as a result of such comparisons indicates a degree of correlation exceeding a threshold value;

electronic tracking means to verify that said degree of correlation exists for a preset time interval and, in dependence on a successful verification by the said tracking means, an electronic locking means to maintain a selected phase difference between the compared series while said degree of correlation exists permitting recovery of the coded signals; the receiver means further comprising:

means to predict values for stored correlation coefficients for a sequence in a received signal;

means to effect an analysis process in which the actual correlation values stored are multiplied by the corresponding aforementioned predicted correlation coefficients;

means to sum the resultant products of each set related to a particular reference signal; and means to compare the summed values of each said set with each other to determine the identity of the sequence.

2. A line network communication system according to claim 1 wherein said receiver means comprises a matched filter for use on the correlation numbers, thereby to take the transmitted signal characteristics into account.

3. A receiver for use in a line network communication system including a transmitter means capable of transmitting a series of coded data signals in a baseband carrier signal, the receiver comprising:

electronic searching means including a correlator to compare a series of received data signals with a series of coded reference signals at different relative phases until at least one comparison signal generated as a result of said comparisons indicates a degree of correlation exceeding a threshold value;

electronic tracking means to verify that said degree of correlation exists for a preset time interval and, in dependence on a successful vertification by the said tracking means, an electronic locking means to maintain a selected phase difference between the compared series while said degree of correlation exists permitting recovery of the coded signals; the receiver means further comprising:

means to predict values for stored correlation coefficients for a sequence in a received signal;

means to effect an analysis process in which the actual correlation values stored are multiplied by the corresponding aforementioned predicted correlation coefficients;

means to sum the resultant products of each set related to a particular reference signal; and means to compare the summed values of each said set with each other to determine the identity of the sequence.

4. A receiver according to claim 3, characterised in that the receiver comprises a matched filer for use on the correlation numbers, thereby to take the transmitted signal characteristics into account.

5. A method of processing signals in a receiver for use in a line network communication system including a transmitter means capable of transmitting a series of coded data signals on a baseband carrier signal and receiver means capable of receiving a transmitted signal and recovering therefrom said coded data signals, the method comprising, in a search mode comparing a series of received data signals with a series of coded reference signals at different relative phases until at least one comparison signal generated as a result of said comparisons indicates a degree of correlation exceeding a threshold value, in a tracking mode verifying that said degree of correlation exists for a preset time interval, and, in dependence on a successful verification in the tracking mode, in a locking mode to maintain a selected phase difference between the compared series while said degree of correlation exists permitting recovery of the coded signals, said comparison stage comprising predicting vlaues for stored correlation coefficients and effecting an analysis process comprising multiplying the actual stored correlation values by the corresponding predicted correlation coefficients, summing the resultant products of each set related to a reference signal, and comparing the sums of each said set to determine the identity of the sequence.

* * * * *